United States Patent
Nagumo

[11] Patent Number: 5,859,736
[45] Date of Patent: Jan. 12, 1999

[54] MAGNETIC RECORDING/REPRODUCING APPARATUS AND METHOD FOR CONTROLLING THE MAGNETIC HEAD DURING POSTRECORDING OR DUBBING OPERATION

[75] Inventor: Masahiko Nagumo, Tokyo, Japan

[73] Assignee: Sony Corporation, Tokyo, Japan

[21] Appl. No.: 705,221

[22] Filed: Aug. 29, 1996

[51] Int. Cl.⁶ ................................................ G11B 27/02
[52] U.S. Cl. ........................... 360/13; 360/77.13; 360/15
[58] Field of Search ................................ 360/15, 13, 75, 360/77.12, 77.13, 77.01, 64; 386/1, 3.9, 46, 96, 104

[56] References Cited

U.S. PATENT DOCUMENTS

| | | | |
|---|---|---|---|
| 5,084,786 | 1/1992 | Konno et AL. | 360/13 |
| 5,282,096 | 1/1994 | Morisaki et al. | 360/13 |
| 5,428,486 | 6/1995 | Nagase | 360/13 |
| 5,539,585 | 7/1996 | Sakai et al. | 360/13 |

*Primary Examiner*—Thang V. Tran
*Attorney, Agent, or Firm*—Frommer Lawrence & Haug LLP; William S. Frommer

[57] ABSTRACT

A magnetic recording/reproducing apparatus is provided which prevents the deterioration of the signal quality when a portion of a signal recorded on successive tracks on the magnetic tape is dubbed (postrecorded).

12 Claims, 7 Drawing Sheets track pattern output from integrator tape leading speed drum PG drum FG head switching signal track timing signal recording/reproducing operation switching signal

MAGNETIC RECORDING/REPRODUCING APPARATUS AND METHOD FOR CONTROLLING THE MAGNETIC HEAD DURING POSTRECORDING OR DUBBING OPERATION

BACKGROUND OF THE INVENTION

The present invention relates to an apparatus for recording/reproducing a digital video signal or a digital audio signal on/from a magnetic tape, and more particularly, to an apparatus for controlling the relative position between a magnetic tape and a magnetic head during postrecording or dubbing operation.

FIG. 8 is an example of a schematic representation of a recording pattern produced by a magnetic recording/reproducing apparatus having a plurality of rotary magnetic heads. In this example, one frame of a television signal is divided across ten tracks. The digital video signal and the digital audio signal are recorded on the respective tracks in a time divisional manner (the structure of each track will be described in greater detail with reference to FIG. 9). Four channels of the digital audio signal can be recorded in a frame of a television signal. Two channels are recorded on the first five tracks of the frame, and the remaining two channels are recorded on the last five tracks of the frame.

Normally, this recording pattern is formed by one pair of magnetic heads whose azimuth angles are different from each other, and which are positioned at the opposite ends of a diameter of a circle (i.e., 180° apart) formed by the outer periphery of a rotary drum. However, when digital signals are sequentially postrecorded or dubbed onto a track, a portion of a preceding track is overwritten in such a manner that its track pitch becomes smaller than the width of the magnetic head.

FIG. 9 is a schematic representation of a track in FIG. 8. The left end of the track lies at the head inlet (rush in) side, and the right side of the track lies at the head exit (separating) side. Each track is composed of an ITI (insert and track information) area, an audio data recording area, a video data recording area and a sub-code data recording area. The contents of these data recording areas are rewritable by way of dubbing.

No data is recorded on an overwrite margin area provided at the right end of the track, and on an IBG (interblock gap) area provided between the respective data recording areas. A pulse signal having the same frequency as the bit frequency of the data is recorded in the amble area, i.e., run up and guard areas, and the amble area is utilized as a PLL lock for extracting a bit clock during the reproducing operation. It should be noted that the overwrite margin provided at the right end portion of the track corresponds to a jitter margin.

FIG. 10 is an example of a schematic representation of the recording pattern corresponding to a two-channel digital audio signal. The digital audio signals in the first five tracks of a frame are assumed to be overwritten by the dubbing process. As illustrated in FIG. 10, the audio undercoat of track 9 (i.e., the previously recorded audio data which is being overwritten by dubbing) is magnetically reduced by the overwrite recording of track 0 and the audio undercoat of track 5 is magnetically reduced by the overwrite recording of track 4. Consequently, during the reproduction of tracks 5 and 9, the C/N (carrier to noise) ratio deteriorates and lowers the reproduction quality of the digital audio signals.

OBJECTS OF THE INVENTION

Therefore, it is an object of the present invention to provide a magnetic recording/reproducing apparatus which overcomes the shortcomings of the above-discussed apparatus.

Another object of the present invention is to provide a magnetic recording/reproducing apparatus which controls the relative position of the magnetic head with respect to the transport direction of the magnetic tape.

Various other objects, advantages and features of the present invention will become readily apparent from the ensuing detailed description, and the novel features will be particularly pointed out in the appended claims.

SUMMARY OF THE INVENTION

In accordance with this invention, the magnetic recording/reproducing apparatus postrecords tracks without overwriting tracks not specified for postrecording. An information signal is received and a frame of the information signal is recorded on N successive tracks of the magnetic tape. M tracks, less than N tracks, of the frame is postrecorded (dubbed or rewritten) without overwriting tracks adjacent to the M tracks.

In accordance with an aspect of this invention, the apparatus controls the relative position of the magnetic head with respect to the transport direction of the magnetic tape.

BRIEF DESCRIPTION OF THE DRAWING

The following detailed description, given by way of example, and not intended to limit the present invention solely thereto, will best be understood in conjunction with the accompanying drawings in which.

DESCRIPTION OF THE PREFERRED EMBODIMENTS

Hereinafter preferred embodiments of the present invention are described in detail with reference to the accompanying drawings.

Figure 1:
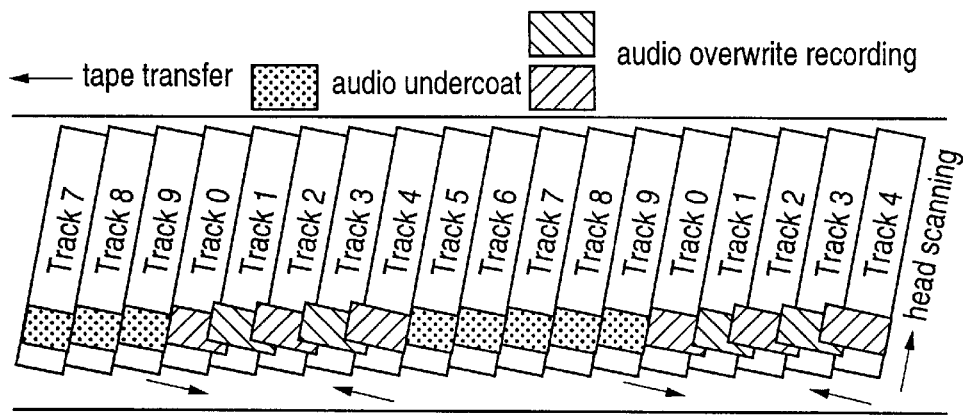
FIG. 1 is a schematic representation of a track pattern formed when two-channel digital audio signals in the first five tracks of a frame are overwritten by a magnetic recording/reproducing apparatus of the present invention during a dubbing operation.
Figure 8:
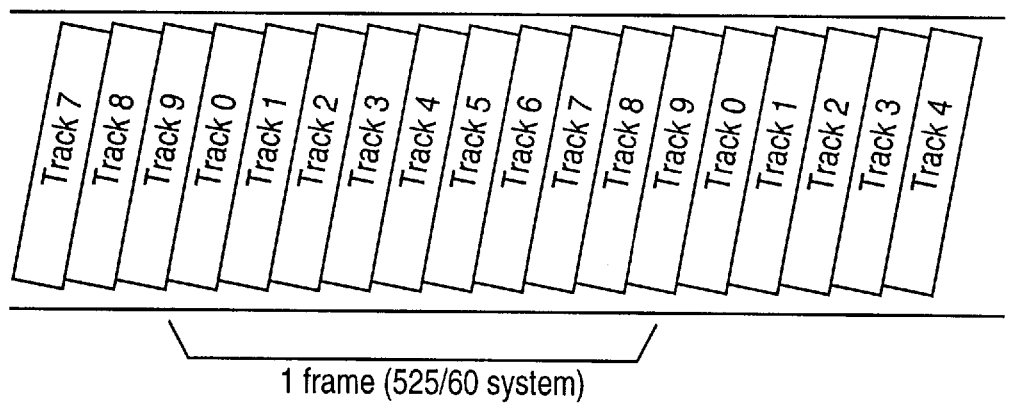
FIG. 8 is a schematic representation of a recording pattern produced by magnetic recording/reproducing apparatus having a plurality of rotary magnetic heads.
Figure 10:
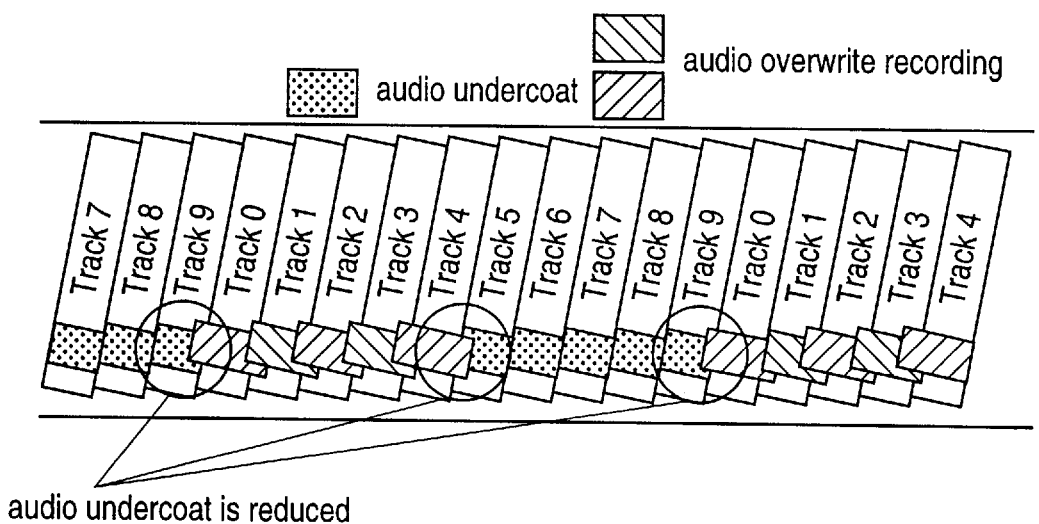
FIG. 10 is an example of a schematic representation of a recording pattern corresponding to a two-channel digital audio signal to which reference has been made in describing how previously recorded audio data is magnetically reduced by magnetic recording/reproducing apparatus having a plurality of rotary heads during the dubbing operation.

FIG. 1 is a schematic representation of a track pattern when two-channel digital audio signals are postrecorded (or dubbed) by a magnetic recording/reproducing apparatus of the present invention. Each frame is recorded across N tracks, where N is preferably 10 in this example. For simplicity, tracks shown in FIG. 1 corresponding to those shown in FIGS. 8 and 10 are denoted by the same reference numerals. As illustrated, when a track 0 is overwritten (postrecorded), a magnetic head is controllable to be relatively displaced in the direction of track 1, and when a track 4 is overwritten (postrecorded), the magnetic head is controllable to be relatively displaced in the direction of track 3. In this example, the left longitudinal boundary of an overwrite recording area for the track 0 is positioned at the right longitudinal boundary of adjacent track 9, and the right longitudinal boundary of an overwrite recording area for the track 4 is located at the left longitudinal boundary of adjacent track 5. As a result, the audio undercoats (i.e., the previously recorded audio data) of the tracks 9 and 5 is not magnetically reduced by postrecording of tracks 0 and 4, respectively. Consequently, the magnetic recording/reproducing apparatus of the present invention advantageously avoids the aforementioned deterioration of the signal quality associated with the reproduction of tracks 5 and 9, i.e. the track pitch of tracks 5 and 9 is not reduced.

Figure 2:
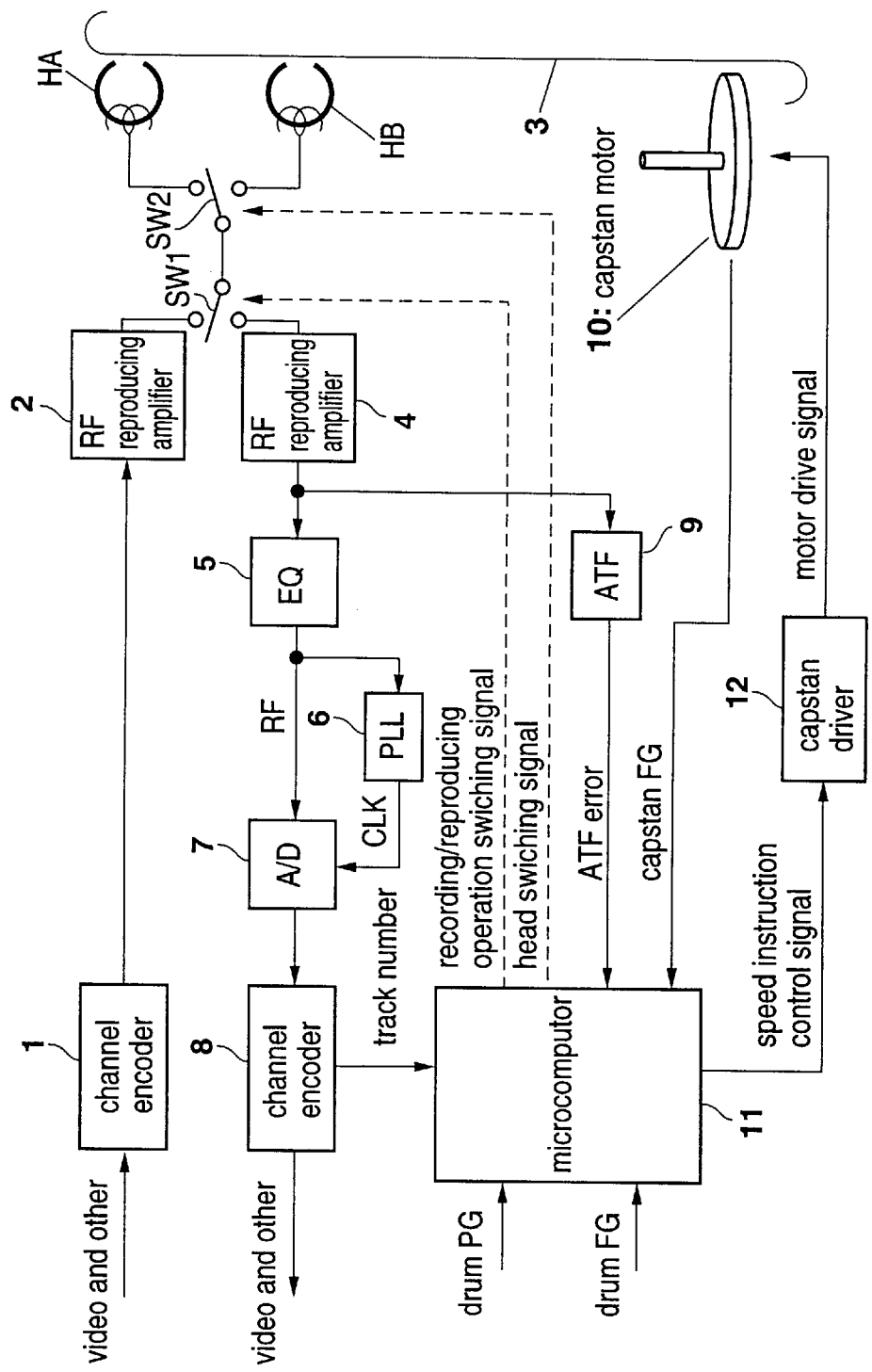
FIG. 2 is a block diagram illustrating an embodiment of the magnetic recording/reproducing apparatus of the present invention.

FIG. 2 is a block diagram illustrating an embodiment of the magnetic recording/reproducing apparatus of the present invention. The magnetic recording/reproducing apparatus generally comprises a recording/reproducing system, an electromagnetic system, and a capstan control system. As illustrated in FIG. 2, the magnetic recording/reproducing apparatus is comprised of a channel encoder 1, a RF recording amplifier 2, a pair of magnetic heads HA and HB, a RF reproducing amplifier 4, an equalizer 5, a channel decoder 8, an ATF (automatic track following) circuit 9, a capstan motor 10, a microcomputer 11, and a capstan driver 12.

A digital video signal, a digital audio signal, a sub-code and the like are supplied to the channel encoder 1 which modulates the digital signal and encodes an ATF pilot signal component onto the digital signal. The modulated signal is supplied to the RF recording amplifier 2 which amplifies the digital signal and selectively supplies the amplified signal to magnetic heads HA and HB under the control of the microcomputer 11 via a recording/reproducing operation changeover switch SW1 and a head changeover switch SW2. The magnetic heads HA and HB alternately record the amplified signal on a magnetic tape 3.

The magnetic heads HA and HB are positioned at the opposite ends of a diameter (i.e., 180° apart) of the outer periphery of a rotary drum (not shown). The magnetic heads HA and HB have different azimuth angles with respect to each other. The magnetic tape 3 is wound around the rotary drum at an inclination angle and the rotary drum is rotated approximately 150 times per second.

The RF signal alternately reproduced from the magnetic tape 3 by the magnetic heads HA and HB under the control of the microcomputer 11 are supplied to the RF reproducing amplifier 4 via the recording/reproducing operation changeover switch SW1 and the head changeover switch SW2. The RF reproducing amplifier 4 amplifies the reproduced RF signal and supplies the amplified RF signal to the equalizer 5 and the ATF circuit 9. The equalizer 5 equalizes (controls) the levels of the amplified RF signal and supplies equalized RF signal to a PLL circuit 6 and an A/D converter 7. The PLL circuit 6 generates a clock signal CLK from the equalized RF signal and supplies the clock signal CLK to the A/D converter 7. The A/D converter 7 digitizes the equalized RF signal at a clock rate determined by the clock signal CLK and supplies the digital signal to the channel decoder 8. The channel decoder 8 decodes the digital signal to generate a digital video signal, a digital audio signal and the like, and extracts track IDs from the digital video and audio signals. The extracted track IDs are supplied to the microcomputer 11.

The track IDs associated with the digital video and audio signals received from the channel decoder 8 represent numbers, for example, 0, 0, 1, 1, 2, 2, 3, 3, 4, 4 with respect to the tracks 0 to 9. The microcomputer 11 identifies the timing of the tracks 0 to 9 based on the rotation phase of the magnetic heads HA and HB derived from the drum phase generator (PG) and frequency generator (FG) signals, and generates a dubbing operation timing signal for a frame based upon the recognized timing of the tracks 0 to 9. The drum PG signal represents the rotation phase of the rotary drum (not shown), and the drum FG signal represents the rotation frequency of the rotary drum. The microcomputer 11 also generates another dubbing operation timing signal for a track based upon the drum PG signal and the drum FG signal. The two dubbing operation timing signals are supplied to the recording/reproducing operation changeover switch SW1. During the dubbing operation, the recording/reproducing operation changeover switch SW1 is operated to state A so that the RF recording amplifier 2 is connected to the head changeover switch SW2.

Returning to FIG. 2, the ATF circuit 9 detects an ATF pilot signal component in the amplified RF signal received from the RF reproducing amplifier 4 and generates an ATF error signal therefrom which is supplied to the microcomputer 11. The microcomputer 11 generates a speed instruction control signal in response to the ATF error signal, a capstan FG signal from the capstan motor 10, and an extracted track ID from the channel decoder 8. The capstan FG signal represents the rotation frequency of the capstan motor 10. The speed instruction control signal is then supplied to the capstan driver 12. In response to the speed instruction control signal, the capstan driver 12 generates and supplies a motor drive signal to the capstan motor 10. The capstan motor 10 adjusts its rotation speed (rotation frequency) in accordance with the motor drive signal so as to modulate the transport speed of the magnetic tape 3.

Figure 3:
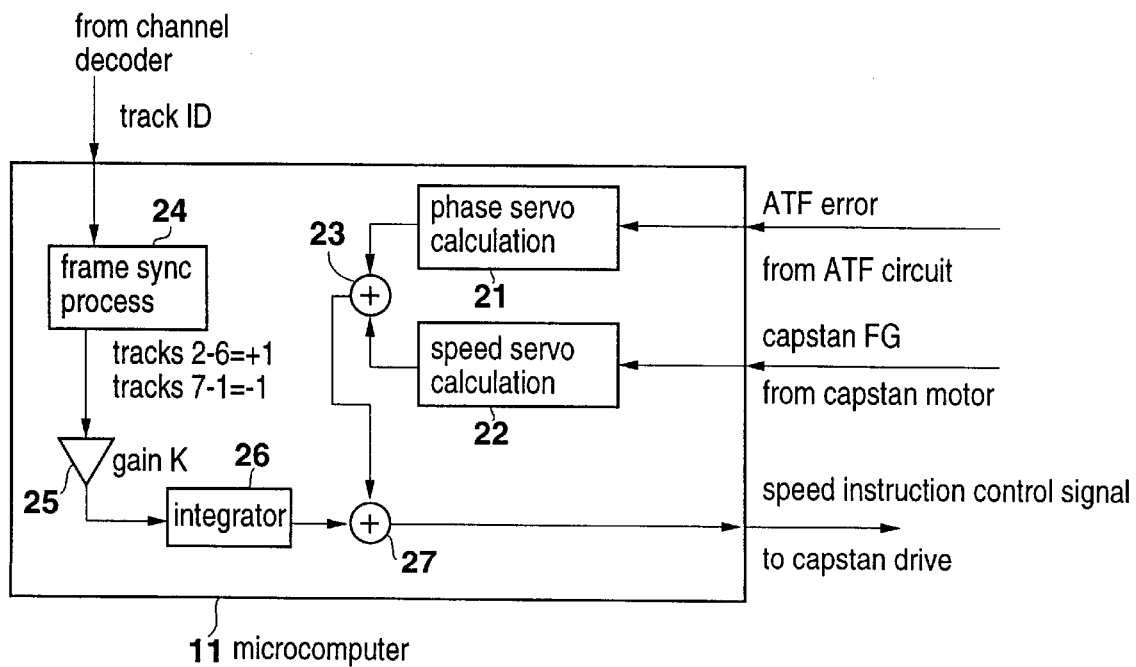
FIG. 3 is a functional block diagram of the capstan control system incorporated in the microcomputer of FIG. 2.

FIG. 3 is a block diagram illustrating the capstan control system of the microcomputer. As illustrated, the capstan control system is comprised of a phase servo calculating unit 21, a speed servo calculating unit 22, a frame sync processing unit 24, and an integrator 26.

The phase servo calculating unit 21 calculates a phase error by comparing the ATF error received from the ATF circuit 9 (FIG. 2) to a target phase value, and supplies the phase error to an adder 23. The speed servo calculating unit 22 calculates a speed error by comparing the value represented by the capstan FG signal received from the capstan motor 10 (FIG. 2) to a target speed value, and supplies the speed error to the adder 23. The adder 23 adds the phase error to the speed error and supplies the result to an adder 27.

The frame sync processing unit 24 generates either a plus 1 or a minus 1 pulse in response to the track IDs received from the channel decoder 8 (FIG. 2) and supplies the generated pulse to an amplifier 25. The amplifier 25 multiplies the pulse by a constant "K" and supplies the multiplied pulse to the integrator 26. The integrator integrates the multiplied value and supplies an integrated signal to the adder 27. The adder 27 generates the speed instruction control signal by adding the integrated signal to the output of the adder 23 and supplies the speed instruction control signal to the capstan driver 12 (FIG. 2). In response to the speed instruction control signal, the capstan driver 12 generates a motor drive signal to control the capstan motor 10 (FIG. 2).

Figure 4A:
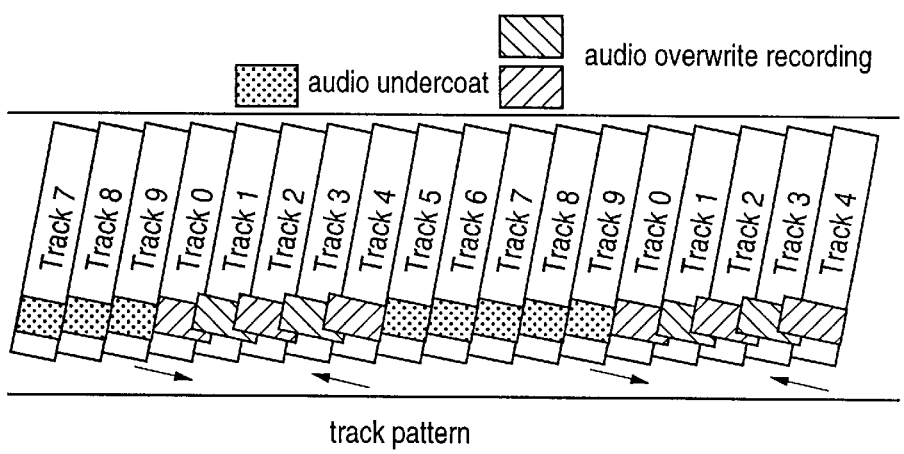
FIGS. 4A–4D constitute a timing diagram to which reference will be made in describing the dubbing operation shown in FIG. 1.
Figure 4B:
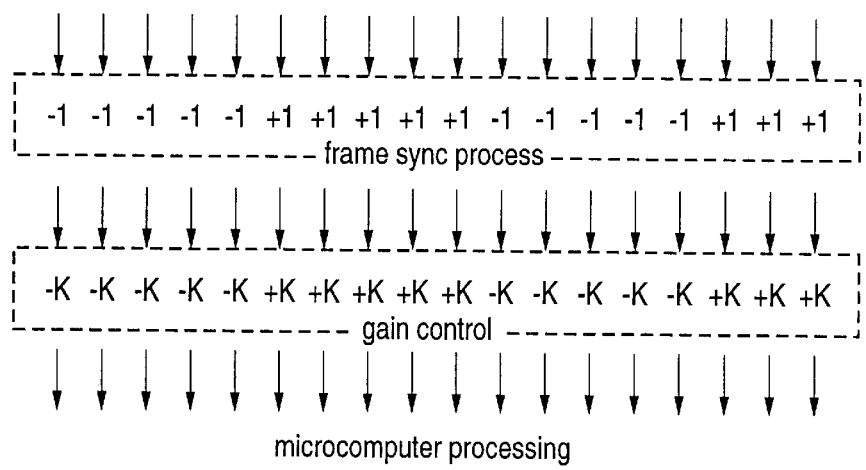
Figure 4C:
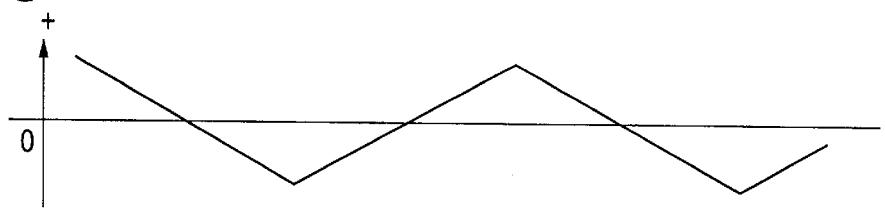
Figure 9:
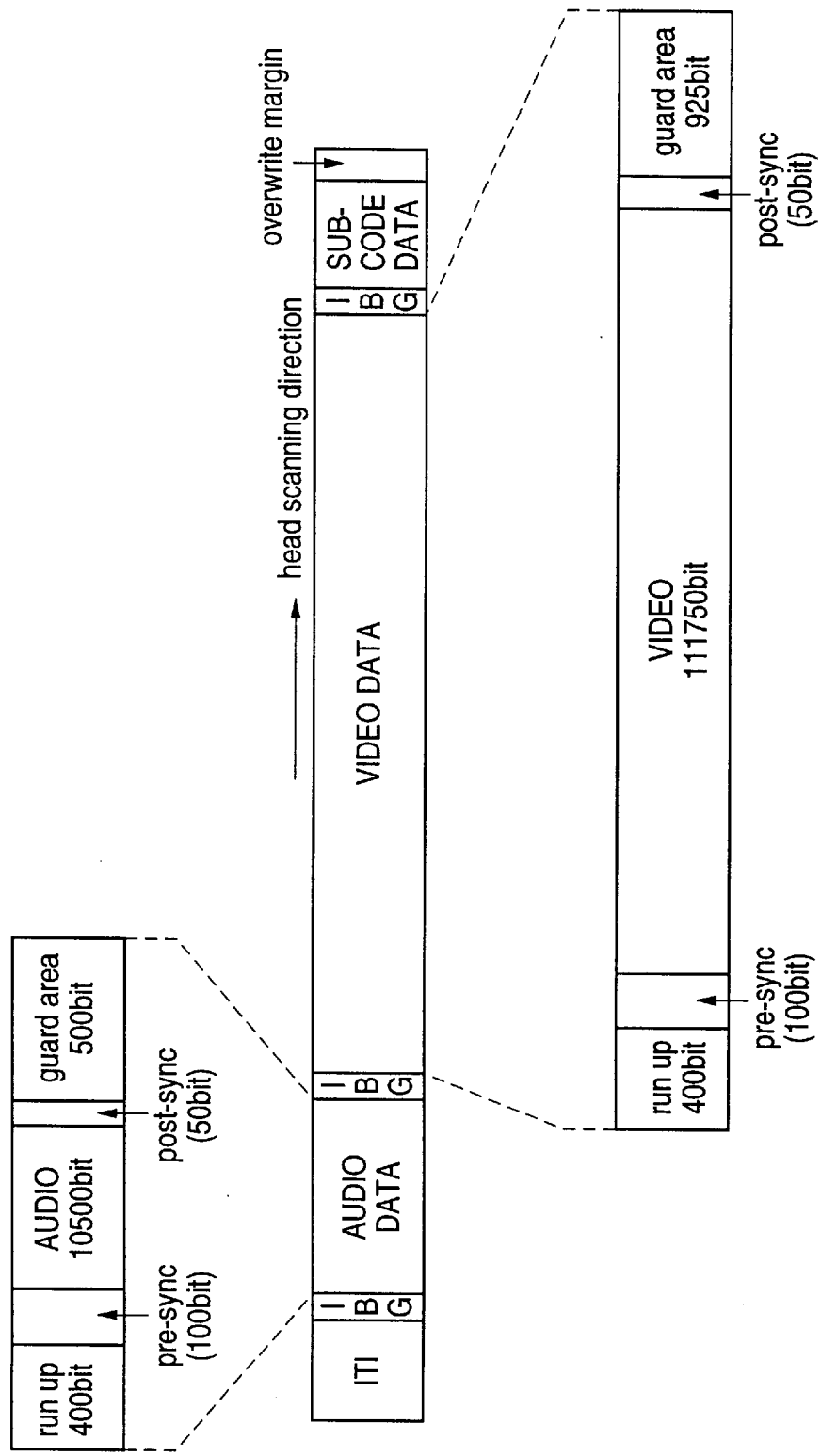
FIG. 9 is a schematic representation of a track in FIG. 8.

The manner in which the microcomputer generates a speed instruction control signal for use in the dubbing (postrecording) operation shown in FIG. 1 will now be explained in conjunction with FIGS. 3 and 4. The channel decoder 8 (FIG. 2) supplies a track ID associated with video data along with presync and postsync of the video data as shown in FIG. 9. The frame sync processing unit 24 determines the timing of the tracks 0 to 9 based upon the track IDs received from the channel decoder 8, and generates a pulse having a value of 1 for tracks 2–6 and a pulse having a value of minus 1 for tracks 0, 1, and 7–9. The generated pulse is supplied to the amplifier 25 which multiplies the value of the pulse by the constant "K" for each track as shown in FIG. 4B. The multiplied value is supplied to the integrator 26 which integrates the multiplied value to form a triangular wave as shown in FIG. 4C. The triangular wave is then supplied to the adder 27 thereby increasing and decreasing the tape transport speed constant with the arrows shown at the bottom edge of the tape in FIGS. 1 and 4A, thereby causing heads HA and HB to be relatively displaced with respect to the tracks, so as to be positioned properly over tracks 0 and 4, for example.

Figure 4D:
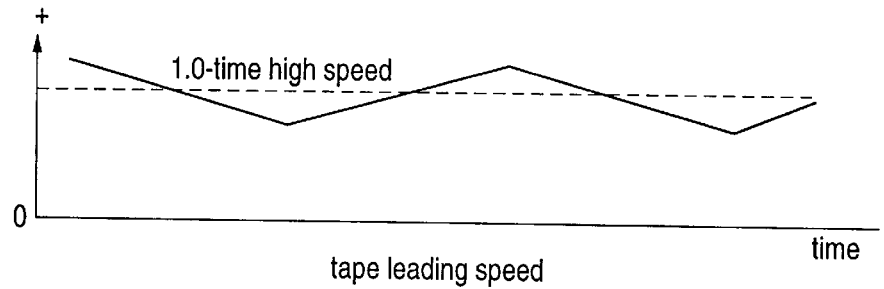

The phase servo calculating unit 21 calculates the phase error by comparing the ATF error received from the ATF circuit 9 (FIG. 2) to the target phase value, and supplies the phase error to the adder 23. The speed servo calculating unit 22 calculates the speed error by comparing the value represented by the capstan FG signal received from the capstan motor 10 (FIG. 2) to the target speed value, and supplies the speed error to the adder 23. The adder 23 synthesizes the two errors by adding the phase error to the speed error and the synthesized error is then supplied to the adder 27. The adder 27 further synthesizes the errors with the triangular wave (FIG. 4C) received from the integrator 26 and supplies the speed instruction control signal to the capstan driver 12 (FIG. 2). In response to the speed instruction control signal, the capstan driver 12 generates a motor drive signal to control the capstan motor 10 (FIG. 2). The capstan motor 10 varies the rotation speed of the capstan (not shown), namely the transport speed of the magnetic tape 3 (FIG. 2) is modulated upwardly and downwardly in response to the output of the integrator 26, as shown in FIG. 4D.

When M tracks in a frame consisting of N tracks are rewritten (dubbed or postrecorded), the tape transport speed is modulated so as to control the relative position of the magnetic heads HA and HB with respect to the transport direction of the magnetic tape. Alternatively, it will be appreciated that the tape transport speed may be kept constant and the magnetic heads are displaced by employing a suitable displacement device such as a bimorph cell or a moving coil. The magnetic heads are relatively displaced in a direction opposite the transport direction of the magnetic tape when a first track of the M tracks to be rewritten is reached, i.e., the longitudinal boundary of the head scanning path is positioned at the left longitudinal boundary of first track 0 during the dubbing of the first track 0 in FIGS. 1, 4A, and 7, where the four tracks 0 to 4 are rewritten. The magnetic heads are relatively displaced in the transport direction of the magnetic tape when the last track of the M tracks to be rewritten is reached, i.e., the right longitudinal boundary of the head scanning path is positioned at the right longitudinal boundary of the last track 4 during the dubbing of track 4 in FIGS. 1, 4A, and 7.

Additionally, the microcomputer 11 generates the head switching signal to operate the head changeover switch SW2, and the recording/reproducing operation switching signal to operate the recording/reproducing operation changeover switch SW1 during the dubbing (postrecording) process based upon the drum PG signal and the drum FG signal.

Figure 5:
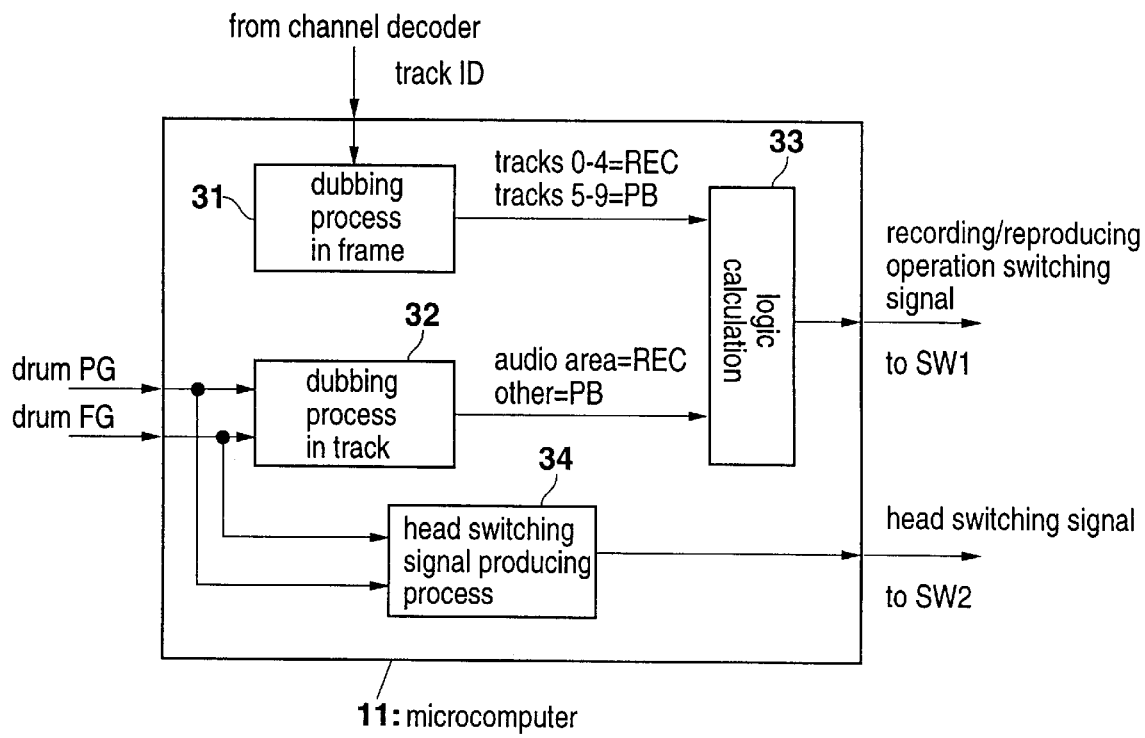
FIG. 5 is a functional block diagram of the dubbing process of the microcomputer of FIG. 2.

FIG. 5 is a functional block diagram illustrating the dubbing (postrecording) process of the microcomputer 11. As illustrated, the dubbing process is performed by a frame dubbing processing unit 31, a track dubbing processing unit 32, a logic calculation unit 33, and a head switching signal producing/processing unit 34.

The frame dubbing processing unit 31 determines the timing of the tracks 0 to 9 based upon the track IDs received from the channel decoder 8 to generate a frame dubbing timing signal and supplies the frame dubbing timing signal to the logic calculation unit 33. The track dubbing processing unit 32 generates a track dubbing timing signal based upon the drum PG and FG signals received from the rotary drum (not shown) and supplies the track dubbing timing signal to the logic calculation unit 33. The logic calculation unit 33 generates the recording/reproducing operation switching signal indicative of the frame and track dubbing timing signals.

The rotary drum additionally supplies the drum PG and FG signals to the head switching signal producing/processing unit 34. The head switching signal producing/processing unit generates the head switching signal based upon the drum PG and FG signals.

The manner in which the microcomputer generates a recording/reproducing operation switching signal and a head switching signal for use in the dubbing (postrecording) operation shown in FIG. 1 will now be explained in conjunction with FIGS. 5 and 6. The frame dubbing processing unit 31 determines the timing of the tracks 0 to 9 based upon the track ID received from the channel decoder 8 (FIG. 2), and generates a frame timing signal indicative of either recording (REC) or playback (PB) in response to this determination. That is, the frame dubbing processing unit 31 generates a bi-level frame timing signal set at either REC or PB level in accordance with the timing of the tracks 0 to 9 and supplies the frame timing signal to the logic calculation unit 33. For example, the frame dubbing processing unit 31 would generate a frame timing signal set at the REC level (corresponding to the high level) for the tracks 0–4 and the PB level (corresponding to the low level) for tracks 5–9 for the dubbing operation shown in FIG. 1.

Figure 6A:
FIGS. 6A–6E constitute a timing diagram to which reference will be made in describing the generation of a recording/reproducing operation switching signal and a head switching signal.
Figure 6B:
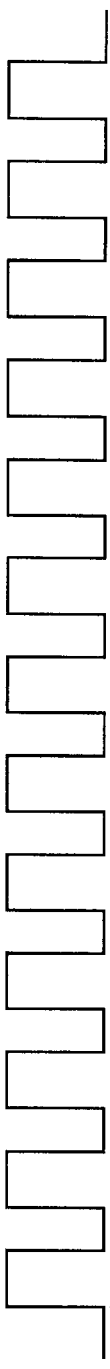
Figure 6C:
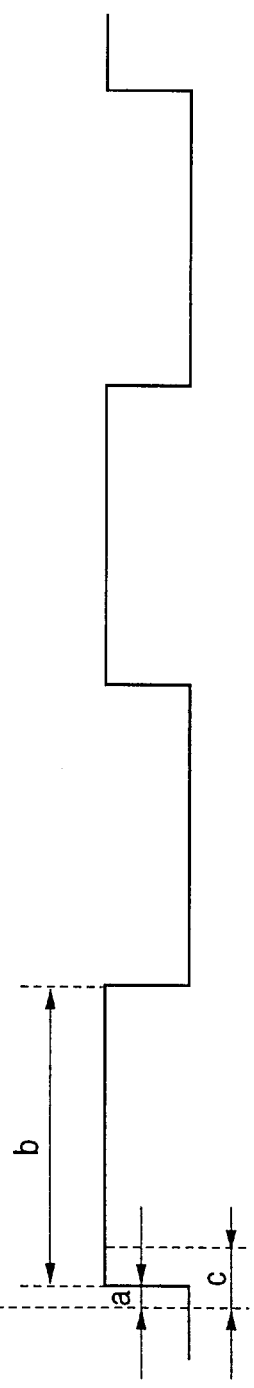
Figure 6D:

The track dubbing processing unit 32 detects a rising edge, that is, a signal transition from a low level to a high level in the drum PG signal (FIG. 6A) and the drum FG signal (FIG. 6B). After detecting the rising edge in the drum PG signal, the track dubbing processing unit 32 generates a track timing signal at the PB (low) level (FIG. 6D). A predetermined time "c" after detecting the rising edge in the drum FG signal, the track dubbing processing unit 32 changes the level of the track timing signal to the REC (high) level. The track dubbing processing unit 32 changes the level of the track timing signal back to the PB level after a predetermined time "d" has elapsed. The predetermined times "c" and "d" correspond to the frequency of the recorded data. The resulting track timing signal shown in FIG. 6D is supplied to the logic calculation unit 33.

Figure 6E:
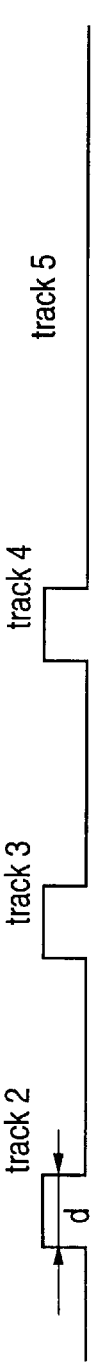

The logic calculation unit 33 generates the recording/reproducing operation switching signal shown in FIG. 6E based upon the frame timing signal and the track timing signal, and then supplies the recording/reproducing operation switching signal to the recording/reproducing operation changeover switch SW1. It should be noted that in FIG. 6E, a high level indicates a recording operation, and a low level denotes a reproducing operation.

The head switching signal producing/processing unit 34 detects rising edges in the drum PG signal (FIG. 6A) and the drum FG signal (FIG. 6B), respectively. The head switching signal producing/processing unit 34 generates a head switching signal at a low level. After detecting the rising edge in the drum PG signal, the head switching signal producing/processing unit 34 keeps the head switching signal at the low level. A predetermined time "a" after detecting the rising edge in the drum FG signal, the head switching signal producing/processing unit 34 changes the level of the head switching signal to a high level. The head switching signal producing/processing unit 34 changes the level of the head switching signal back to the low level after a predetermined time "b" has elapsed. The resulting head switching is supplied to the head changeover switch SW2.

The manner in which the magnetic recording/reproducing apparatus of FIG. 2 postrecords (rewrites or dubs) a digital signal on M tracks of the magnetic tape 3 will now be explained. M is preferably less than N, where N is the total number of tracks in a frame. A recording processing circuit (not shown) supplies the digital video signal, the digital audio signal, and the sub-code to the channel encoder 1. The channel encoder 1 modulates the supplied digital signal and encodes an ATF pilot signal component onto the digital signal. The modulated signal is supplied to the RF recording amplifier 2 which amplifies the modulated digital signal and supplies the amplified digital signal to the head changeover switch SW2 via the recording/reproducing operation changeover switch SW1.

The microcomputer 11 sends the recording/reproducing operation switching signal (FIG. 6E) to the recording/reproducing operation changeover switch SW1 to operate the switch SW1 to state A so that RF recording amplifier 2 is connected to the head changeover switch SW2. In response to a head switching signal (FIG. 6C) from the microcomputer 11, the head changeover switch SW2 selectively directs the amplified digital signal to the magnetic head HA or HB. The magnetic heads HA and HB alternately record the amplified digital signal on magnetic tape 3 to form the track (recording) pattern shown in FIGS. 8 and 9.

The manner in which the magnetic recording/reproducing apparatus of FIG. 2 reproduces the RF signal from the magnetic tape will now be explained. The microcomputer 11 sends the recording/reproducing operation switching signal (FIG. 6E) to the recording/reproducing operation changeover switch SW1 to operate the switch SW1 to state B so that the RF reproducing amplifier 4 is connected to the head changeover switch SW2. The microcomputer also operates the head changeover switch SW2 to switch between states C and D so that the RF reproducing amplifier 4 is alternately connected to the magnetic heads HA and HB in response to the head switching signal of FIG. 6C. The RF signal alternately reproduced from the magnetic tape 3 by the magnetic heads HA and HB is supplied to the RF reproducing amplifier 4 via the head changeover switch SW2 and the recording/reproducing operation changeover switch SW1. The RF reproducing amplifier amplifies the reproduced RF signal and supplies the amplified RF signal to the equalizer 5.

The equalizer 5 equalizes the amplified RF signal in such a manner that the levels of the resultant (equalized) RF signal are maintained substantially constant by AGC (auto-gain control) and supplies the equalized RF signal to the PLL circuit 6 and the A/D converting circuit 7. The PLL circuit 6 generates the clock signal CLK from the equalized RF signal and supplies the clock signal CLK to the A/D converter 7. The A/D converter 7 digitizes the equalized RF signal at the clock interval of the clock signal CLK and supplies the digital signal to the channel decoder 8. The channel decoder 8 demodulates the digital signal to generate a digital video signal, a digital audio signal and the like, and extracts track IDs from the digital video and audio signals. The extracted track IDs are supplied to the microcomputer 11.

Figure 7:
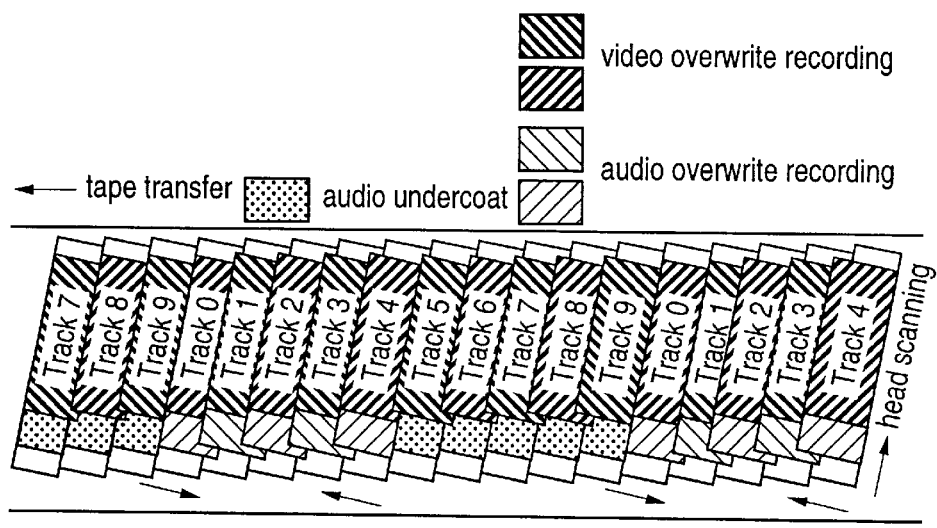
FIG. 7 is a schematic representation of a track pattern formed when two-channel audio signals and a video signal are overwritten by a magnetic recording/reproducing apparatus of the present invention during the dubbing operation.

FIG. 7 is a schematic representation of a track pattern when two-channel digital audio signals and a digital video signal are postrecorded (dubbed) by the magnetic recording/reproducing apparatus of the present invention. For simplicity, tracks shown in FIG. 7 corresponding to those shown in FIG. 1 are denoted by the same reference numerals. In this example, the digital audio signals of the tracks 0 to 4 are postrecorded (dubbed) in a manner similar to that depicted in FIG. 1 and the digital video signals of all the tracks (0–9) are additionally dubbed. It should be noted that the tape transport speed is modulated (FIG. 4D) in such a manner as to position the magnetic heads HA and HB on the magnetic tape 3 so as to align the overwrite recording area with the tracks 0 and 4 as shown in FIGS. 7, similar to FIGS. 1 and 4A.

While the present invention has been particularly shown and described with reference to a preferred embodiment, it will be readily appreciated that various changes may be made without departing from the spirit and scope of the invention. For example, although the digital audio signals in tracks 0 to 4 are dubbed (postrecorded), it is understood that the digital audio signals in other tracks such as 5 to 9 may be postrecorded. Also, although each frame of the digital signal is described as being divided into 10 tracks, it is understood that a frame can be divided differently, i.e., 12, 20, 24 . . . tracks per frame. Still further, the magnetic recording/reproducing apparatus of the present invention can be advantageously used to rewrite (postrecord) a magnetic tape that has been originally recorded by another magnetic recording apparatus.

It is intended that the appended claims be interpreted to include the embodiments discussed above, those various alternatives which have been described and all equivalents thereto.

What is claimed is:

1. Apparatus for recording an information signal on a magnetic tape, comprising:

means for receiving said information signal;

means for transporting said magnetic tape in a transport direction;

means including a magnetic head for recording a frame of said information signal on N successive tracks on said magnetic tape, wherein N is an integer and wherein a track pitch of each of said tracks is shorter than the width of said magnetic head;

means for postrecording M tracks of said frame, wherein M is an integer less than N and greater than or equal to 2; and means for controlling a relative position of said magnetic head with respect to said transport direction of said magnetic tape to inhibit tracks adjacent to said M tracks from being overwritten during the postrecording of said M tracks.

2. The apparatus of claim 1, wherein said means for controlling is operable to cause relative displacement of said magnetic head in a direction opposite to said transport direction of said magnetic tape when the first of said M tracks is postrecorded and to cause relative displacement of said magnetic head in said transport direction of said magnetic tape when the last of said M tracks is postrecorded.

3. The apparatus of claim 1, wherein said means for controlling comprises tape transport means for controlling a transport speed of said magnetic tape.

4. The apparatus of claim 1, wherein said information signal comprises different digital information signals.

5. Apparatus for recording and reproducing an information signal on a magnetic tape, comprising:

means for receiving said information signal;

means for transporting said magnetic tape in a transport direction;

means including a magnetic head for recording a frame of said information signal on N successive tracks on said magnetic tape, wherein N is an integer and wherein a track pitch of each of said tracks is shorter than the width of said magnetic head;

means for postrecording M tracks of said frame, wherein M is an integer less than N and greater than or equal to 2;

means for controlling a relative position of said magnetic head with respect to said transport direction of said magnetic tape to inhibit tracks adjacent to said M tracks from being overwritten during the postrecording of said M tracks; and means for reproducing the information signal recorded on said N successive tracks on said magnetic tape.

6. The apparatus of claim 5, wherein means for controlling is operable to cause relative displacement of said magnetic head in a direction opposite to said transport direction of said magnetic tape when the first of said M tracks is postrecorded and to cause relative displacement of said magnetic head in said transport direction of said magnetic tape when the last of said M tracks is postrecorded.

7. The apparatus of claim 5, wherein said means for controlling comprises tape transport means for controlling a transport speed of said magnetic tape.

8. The apparatus of claim 5, wherein said information signal comprises different digital information signals.

9. A method of recording and reproducing an information signal on a magnetic tape, comprising the steps of:

receiving said information signal;

transporting said magnetic tape in a transport direction;

recording a frame of said information signal on N successive tracks on said magnetic tape with magnetic head, wherein N is an integer and wherein a track pitch of each of said tracks is shorter than the width of said magnetic head;

postrecording M tracks of said frame, wherein M is an integer less than N and greater than or equal to 2;

controlling a relative position of said magnetic head with respect to said transport direction of said magnetic tape to inhibit tracks adjacent to said M tracks from being overwritten during the postrecording of said M tracks; and reproducing the information signal recorded on said N successive tracks on said magnetic tape.

10. The method of claim 9, wherein the step of controlling causes relative displacement of said magnetic head in a direction opposite to said transport direction of said magnetic tape when the first of said M tracks is postrecorded and causes relative displacement of said magnetic head in said transport direction of said magnetic tape when the last of said M tracks is postrecorded.

11. The method of claim 9, wherein the step of controlling controls a transport speed of said magnetic tape.

12. The method of claim 9, wherein said information signal comprises different digital information signals.

* * * * *

UNITED STATES PATENT AND TRADEMARK OFFICE
CERTIFICATE OF CORRECTION

PATENT NO. : 5,859,736
DATED : Jan. 12, 1999
INVENTOR(S) : Masahiko Nagumo

It is certified that error appears in the above-identified patent and that said Letters Patent is hereby corrected as shown below:

On the title page: Item

-- [30]  Foreign Application Priority Data

Aug. 31, 1995  [JP] Japan ............... 7-246843   --

Signed and Sealed this

Fourteenth Day of September, 1999

Attest:

Q. TODD DICKINSON

*Attesting Officer*       *Acting Commissioner of Patents and Trademarks*